United States Patent
Singer et al.

(10) Patent No.: US 9,501,495 B2
(45) Date of Patent: Nov. 22, 2016

(54) LOCATION METADATA IN A MEDIA FILE

(75) Inventors: David William Singer, San Francisco, CA (US); John Samuel Bushell, San Jose, CA (US); Thal-Wey Then, Santa Clara, CA (US); Christopher Lance Flick, San Jose, CA (US)

(73) Assignee: Apple Inc., Cupertino, CA (US)

( * ) Notice: Subject to any disclaimer, the term of this patent is extended or adjusted under 35 U.S.C. 154(b) by 709 days.

(21) Appl. No.: 12/765,725

(22) Filed: Apr. 22, 2010

(65) Prior Publication Data

US 2011/0264715 A1    Oct. 27, 2011

(51) Int. Cl.
*G06F 17/30*    (2006.01)
*G11B 27/034*    (2006.01)

(52) U.S. Cl.
CPC ..... *G06F 17/30241* (2013.01); *G06F 17/3002* (2013.01); *G11B 27/034* (2013.01)

(58) Field of Classification Search
USPC ........... 348/14.02, 14.15, 49, 50, 54, 55, 64, 348/107, 116, 137, 142, 174, 202, 211.2, 348/211.9, 224.1, 231.4, 14.1, 14.14, 47, 348/73, 34, 95, 99, 100, 102, 105, 141, 348/222.1
See application file for complete search history.

(56) References Cited

U.S. PATENT DOCUMENTS

| | | | |
|---|---|---|---|
| 5,917,543 A * | 6/1999 | Uehara | 348/211.9 |
| 6,023,241 A | 2/2000 | Clapper | |
| 6,741,790 B1 | 5/2004 | Burgess | |
| 7,149,961 B2 | 12/2006 | Harville et al. | |
| 7,454,090 B2 | 11/2008 | Wilcock et al. | |
| 2002/0093886 A1 * | 7/2002 | Ijichi et al. | 369/30.09 |
| 2002/0097324 A1 * | 7/2002 | Onuki | 348/208 |
| 2003/0214582 A1 * | 11/2003 | Takahashi et al. | 348/116 |
| 2004/0003060 A1 | 1/2004 | Asoh et al. | |
| 2004/0217884 A1 * | 11/2004 | Samadani et al. | 340/995.14 |
| 2005/0065916 A1 | 3/2005 | Ge et al. | |
| 2005/0276090 A1 * | 12/2005 | Yamagishi | 365/145 |
| 2006/0026184 A1 | 2/2006 | Hewing et al. | |
| 2006/0098899 A1 | 5/2006 | King et al. | |
| 2006/0200258 A1 * | 9/2006 | Hoffberg et al. | 700/86 |
| 2007/0300295 A1 | 12/2007 | Kwok et al. | |
| 2008/0071465 A1 * | 3/2008 | Chapman et al. | 701/117 |
| 2008/0097771 A1 | 4/2008 | Flom et al. | |
| 2009/0140887 A1 * | 6/2009 | Breed et al. | 340/990 |
| 2009/0228508 A1 * | 9/2009 | Date et al. | 707/102 |

* cited by examiner

*Primary Examiner* — Son T Hoang
(74) *Attorney, Agent, or Firm* — Kilpatrick Townsend & Stockton LLP

(57) ABSTRACT

This is directed to systems, methods and computer-readable media for media files having timed and untimed location metadata. For example, a media file can include timed location metadata stored in a metadata track of the media file, such that individual timed packets of location information are each associated with different portions of the recorded media. In some embodiments, the location metadata can include information describing the direction the device is facing and/or elevation/tilt of the device relative a horizontal plane (e.g. a plane perpendicular to a line between the device position and the center of the earth) and/or a motion of the device.

24 Claims, 15 Drawing Sheets

LOCATION METADATA IN A MEDIA FILE

RELATED APPLICATIONS

Applicant claims the benefit of priority of prior, provisional application Ser. No. 61/171,163, filed Apr. 22, 2009, the entirety of which is incorporated by reference.

FIELD OF THE INVENTION

This invention relates to timed and untimed location metadata in media files.

COPYRIGHT NOTICE

The present description includes material protected by copyrights. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Inc. 2010.

BACKGROUND OF THE INVENTION

Many electronic devices that have the ability to capture media, either as still images, video, audio, and/or a combination thereof. For example, an electronic device can include a lens that can be used to capture light from a user's environment, and use the captured light to generate the still image or video. When the electronic device stores captured images substantially continuously, the electronic device can store the images as video. To assist a user in managing stored media, the electronic device can mark the media file with different types of information that may be of interest to the user (e.g., as metadata). For example, the electronic device can provide a time and date for when the video was recorded. As another example, the electronic device can specify attributes of the lens and environment to assist the user in post-production (e.g., store information related to the light conditions at the time of recording). As still another example, the electronic device can provide the user with an opportunity to enter a note describing attributes of the video.

Some electronic devices can also mark a recorded video with position information from when the video recording started or stopped. For example, position detection circuitry of the electronic device can identify the device current position at the time of starting or stopping the recording, and mark the recording with that single position information (e.g., in a metadata header). When a user moves over larger distances while recording, however, the stored initial or final position information may not be sufficiently useful to the user. In addition, even if a user does not move over large distances, a user may not know the orientation of the electronic device, which can prevent a user from properly identifying or enjoying recoded video content (e.g., if filming the architecture surrounding the user, the user may not be able to determine the positions of the architectural elements within the space from the recorded video).

SUMMARY OF THE DESCRIPTION

A method and apparatus of storing location information in a media file generated by an electronic device is described, where the location information can include one or more of a position, motion, and/or orientation of the device. In an exemplary method, the electronic device captures a continuous recording of media. Furthermore, the electronic device determines, at a plurality of intervals, a current position of the electronic device. The electronic device stores the captured media and the plurality of determined current positions of the device in a file comprising at least two tracks, where the media is stored in a first track and the plurality of determined current positions are stored in a second track such that distinct portions of the media captured at each of the plurality of intervals are associated with one of the plurality of determined current positions for that same interval.

In another exemplary method, the electronic device stores orientation information and motion information describing the orientation of the electronic device relative to a fixed point (e.g., relative to north) and relative to a horizontal plane (e.g., relative to the horizon).

A media file can be characterized by different types of metadata stored as part of the media file, or in a distinct file linked to the media file. In one embodiment, media can be video, still image, audio, and/or a combination thereof (e.g., audio and video). The metadata can include information such as, for example, a compression format, timing information, the number of tracks (e.g., video, audio and data), user entered data, or any other information for providing context to the user or for enabling an electronic device to parse and play back the media file. Metadata can be stored in a number of manners, including for example in the header of a file (e.g., an atom in a QuickTime™ movie file) or in a metadata track of the file.

Location information can be stored in a media file using any suitable approach. In some embodiments, the location information can be determined at a single time, for example when the media recording begins and ends. This location metadata may then be viewed as being untimed. Alternatively, the location information can be determined at several times during the media recording. For example, the location information can be determined at different times (e.g., at predetermined time intervals) such that location metadata is updated and stored at different times during the recording. This location metadata may then be viewed as being timed. The timed metadata can be stored using any suitable approach, including for example in a metadata track of the media file, where the metadata track includes time-stamped location metadata. The location metadata can include metadata describing timed and untimed position(s), motion(s), and/or orientation(s) of the device.

In some embodiments, the location metadata can include, in addition to coordinate information identifying a position (e.g., global positioning system (GPS) coordinate data), orientation information describing the orientation of the electronic device recording the media, and/or motion information describing the motion of the electronic device. The orientation information can include any suitable number or types of components, including for example, a direction in which the device faces quantified by a compass reading (e.g., relative to the north pole) and an attitude or elevation relative to the horizon, to the plane of the surface on which the user stands, or to any other known or predetermined plane. The orientation information can be untimed (e.g., stored once in a metadata header) or timed (e.g., stored in a metadata track along with other location and other types of metadata).

BRIEF DESCRIPTION OF THE DRAWINGS

The present invention is illustrated by way of example and not limitation in the figures of the accompanying drawings in which like references indicate similar elements.

DETAILED DESCRIPTION

Figure 1A:
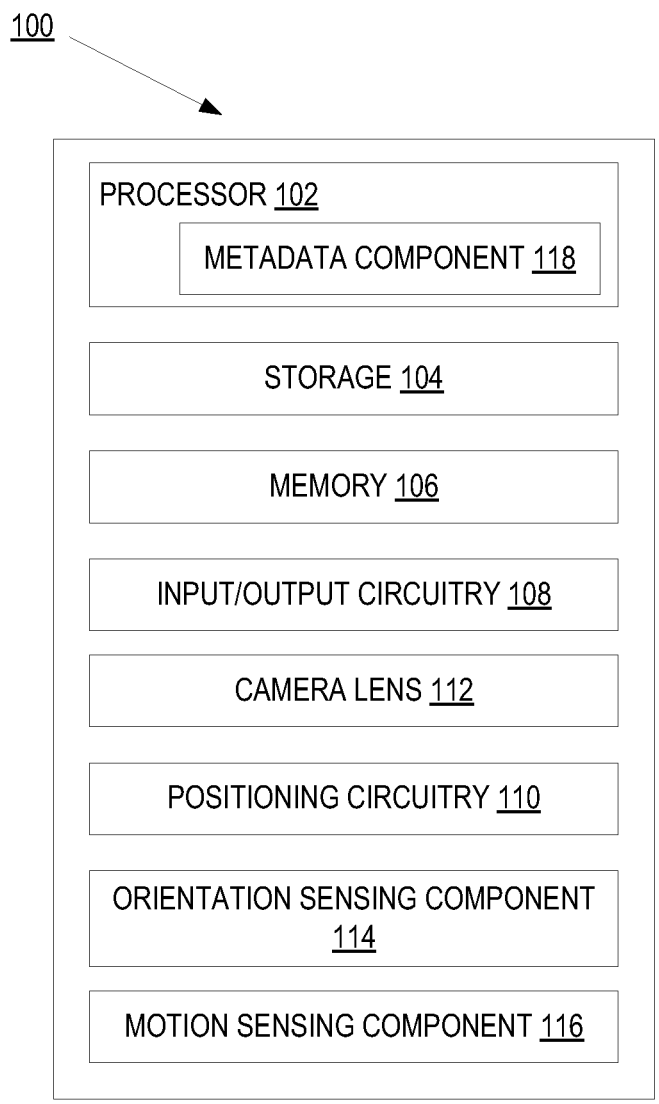
FIG. 1A is a schematic view of an illustrative electronic device for capturing images in accordance with one embodiment of the invention.

A method and apparatus of storing location information in a media file generated by an electronic device is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), firmware, software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The term "host" and the term "portable storage device" are intended to refer generally to data processing systems rather than specifically to a particular form factor for the host versus a form factor for the device.

An electronic device can capture media of a user's environment. For example and in one embodiment, an electronic device can include an optical or digital lens operative to capture light reflected from the user's environment. The electronic device may be operative to store particular images captured by the lens for playback (e.g., for future playback or editing). Recorded media can be tagged with different types of metadata to assist a user in reviewing or editing media. For example and in one embodiment, media files generated by the electronic device can include metadata describing the file type, resolution, electronic device type, lens characteristics, environment or lighting characteristics, time and date, and any other suitable information. In some embodiments, the media files can be tagged with location information.

The electronic device can determine its current position using any suitable approach. Position is the place of where the device is situated and can be defined using any known coordinate system (e.g., coordinates, elevation, angles, etc. and/or a combination thereof). In some embodiments, the electronic device can include embedded positioning circuitry (e.g., GPS circuitry). Alternatively or in addition, a positioning accessory can be coupled to the electronic device. The positioning circuitry can provide positioning information to the electronic device using any suitable approach, including for example GPS information, cellular tower information or other information measuring a current position, or tracking information describing a user's movements from a known point of origin. In some embodiments, the positioning information can include a description or text-based information for describing a predetermined position such as a user-defined position, a city, or a landmark (e.g., home, Angel Island, or Golden Gate Bridge).

The electronic device can incorporate the position information provided by the positioning circuitry using any suitable approach. In some embodiments, the electronic device can receive position information from the positioning circuitry at predetermined or known intervals (e.g., every second, 5 seconds, 1 minute, or 2 minutes). This interval can vary. For example and in one embodiment, the electronic device can receive position information in varying time intervals, based on the output of other electronic device sensors (e.g., direct the positioning circuitry to identify a current position more often if an accelerometer detects that the electronic device is moving). The timed position information can be stored as metadata for the recorded media file using any suitable approach. In some embodiments, the media file can include a metadata track in addition to one or more audio and video tracks to store the timed position information. The position information can include a time stamp to associate particular position information with particular video and/or audio from the other tracks of the media file.

To provide additional information related to the attributes of the recorded video, an electronic device can detect and add orientation metadata to the location metadata. The orientation metadata can be determined by any suitable electronic device component, including for example, a compass or magnetometer. The orientation metadata can provide any suitable information for describing the orientation of the electronic device in one or more planes. For example and in one embodiment, the orientation metadata can include a direction component indicating the orientation of the electronic device relative to latitude and longitude lines. The direction component can be quantified using any suitable approach, including for example as a heading relative to the magnetic north or to the true north.

In some embodiments, the orientation metadata can include an elevation component indicating the orientation of the electronic device relative to a horizontal plane perpendicular to a line extending between the center of the earth and the electronic device. The elevation component can be quantified using any suitable approach, including for example by measurements of angles. The elevation component can have any suitable precision, including for example in degrees, minutes of degrees, seconds of degrees, tenths of degrees, or other sub-set of a degree. The orientation metadata can be timed or untimed, and stored in any suitable manner, including any of the mechanisms described above in connection with location metadata or as part of the location metadata.

FIG. 1A is a schematic view of an illustrative electronic device for changing the display of information based on device movement in accordance with one embodiment of the invention. Electronic device 100 can include any suitable type of electronic device having a lens. For example and in one embodiment, electronic device 100 can include a media player such as an iPod® available by Apple Inc., of Cupertino, Calif., a cellular telephone, a personal e-mail or messaging device (e.g., a Blackberry® or a Sidekick®), an iPhone® or iPad® available from Apple Inc., pocket-sized personal computers, personal digital assistants (PDAs), portable gaming console, a laptop computer, a personal computer, a computer in a moving vehicle, a music recorder, a video recorder, a camera, or any other electronic device capable of movement. The electronic device can include or be coupled to positioning circuitry to determine the current position of the electronic device.

Electronic device 100 can include a processor or control circuitry 102, storage 104, memory 106, input/output circuitry 108, positioning circuitry 110, camera lens 112, orientation sensing component 114, motion sensing component 116, and metadata component 118. In some embodiments, one or more of electronic device components 100 can be combined or omitted (e.g., combine storage 104 and memory 106), or electronic device 100 can include other components not combined or included in those shown in FIG. 1A (e.g., communications circuitry, motion detection or sensing components, or positioning circuitry), or several instances of the components shown in FIG. 1A. For the sake of simplicity, only one of each of the components is shown in FIG. 1A.

Positioning circuitry 110 can include any suitable circuitry for determining the current position of electronic device 100, and can be operative to update the current position at any suitable rate, including at relatively high rates to provide an estimation of speed and distance traveled. In some embodiments, positioning circuitry 110 can include a GPS receiver for accessing a GPS application function call that returns the geographic coordinates (i.e., the geographic position) of the device. In one embodiment, a GPS system is any system capable of determining position, including satellite based locations systems (e.g., the United States GPS location system, the European Galileo location system, etc.) The geographic coordinates can be fundamentally, alternatively, or additionally derived from any suitable trilateration or triangulation technique. For example and in one embodiment, the device can determine its position using various measurements (e.g., signal-to-noise ratio ("SNR") or signal strength) of a network signal (e.g., a cellular telephone network signal) associated with the device. For example and in one embodiment, a radio frequency ("RF") triangulation detector or sensor integrated with or connected to the electronic device can determine the approximate position of the device. The device's approximate position can be determined based on various measurements of the device's own network signal, such as: (1) the angle of the signal's approach to or from one or more cellular towers, (2) the amount of time for the signal to reach one or more cellular towers or the user's device, (3) the strength of the signal when it reaches one or more towers or the user's device, or any combination of the aforementioned measurements, for example. Other forms of wireless-assisted GPS (sometimes referred to herein as enhanced GPS or A-GPS) can also be used to determine the current position of electronic device 100.

In some embodiments, a device can determine its position based on a wireless network or access point that is in range or a wireless network or access point to which the device is currently connected. For example and in one embodiment, because wireless networks have a finite range, a network that is in range of the device can indicate that the device is located in the approximate geographic position of the wireless network. In some embodiments, the device can automatically connect to a wireless network that is in range in order to receive the valid modes of operation for that position.

In some embodiments, electronic device 100 can include an orientation sensing component 114 operative to detect the orientation, or changes in the orientation of electronic device 100. For example and in one embodiment, an orientation sensing component 114 can be used to detect the absolute direction of electronic device relative to a fixed point or axis. In one embodiment, the orientation component 114 determines the orientation of the lens 112 of the electronic device. In some embodiments, an orientation sensing component 114 can include a compass or magnetometer operative to measure the orientation of the device relative to the North Pole. In some embodiment, the orientation sensing component 114 can instead or in addition detect the elevation of the electronic device relative to a fixed plane (e.g., relative to the horizon). Furthermore, the orientation and/or motion information can be timed. For example and in one embodiment, if the electronic device 100 is continually pointed toward a building (or other object) while being passed (e.g., in a train or other vehicle), the orientation, motion, and position of the electronic device 100 would change over time. As another example and in another embodiment, if the electronic device 100 stood in the same position but the lens was orbited around the position pointing out the surroundings, the orientation and the motion of the electronic device 100 would change over time but not necessarily the position.

In some embodiments, electronic device 100 can include a motion sensing component 116 operative to detect movements of electronic device 100 to augment the output of the positioning circuitry. For example and in one embodiment, the motion sensing component 116 is a motion sensor that can be operative to detect a user's movements of electronic device 100 and thus determine a change in position and/or orientation (e.g., which can be used to confirm or supplement the output of an orientation sensing component 114). In some embodiments, the motion sensing component 114 can include one or more three-axis acceleration motion sensors (e.g., an accelerometer) operative to detect linear acceleration in three directions (i.e., the x or left/right direction, the y or up/down direction, and the z or forward/backward direction). As another example and in another embodiment, the motion sensing component 114 can include one or more two-axis acceleration motion sensors which can be operative to detect linear acceleration only along each of x or left/right and y or up/down directions (or any other pair of directions). In some embodiments, the motion sensing component 114 can include an electrostatic capacitance (capacitance-coupling) accelerometer that is based on silicon micro-machined MEMS (Micro Electro Mechanical Systems) technology, a piezoelectric type accelerometer, a piezoresistance type accelerometer, or any other suitable accelerometer. In another embodiment, the motion sensing component 114 is a gyroscope or other motion sensor known in the art that can determine motion of the device. In one embodiment, the motion sensing component 116 is the positioning circuitry 110, orientation sensing component 114, or a combination thereof. In this embodiment, the motion of the electronic device 100 is derived from changes in positions and/or orientation.

Camera lens 112 can include any suitable lens operative to capture images or video of the electronic device environment. For example and in one embodiment, the electronic device can include an optical or digital lens for capturing light reflected from the user's environment. The captured light can be recorded as individual distinct images, or as consecutive video frames of a recording (e.g., several video frames constituting a primary frame and subsequent frames indicating the difference between the primary frame and the subsequent frames). The control circuitry may associate different metadata with the recorded images, including for example positioning information, device movement information, a time code, a device identifier, or any other suitable metadata. As used in this application, the term camera lens will be understood to mean a lens for capturing light from a device environment, or a lens and appropriate circuitry for converting captured light into an image that can be previewed or stored by the device.

In one embodiment, control circuitry 102 further includes metadata component 118 is a component of the electronic device 100 that receives the position, orientation, and/or motion information from the relevant components (positioning circuitry 110, orientation sensing component 114, motion sensing component 116, respectively) and associates this information with the captured media. Associating, as used herein, means to correlate parts or all of the location metadata with parts of the corresponding media. In one embodiment, the location metadata is associated with the media based on timestamps. Thus, parts of the resulting stored location metadata will correspond to the some or all of the media data. Metadata component 118 can associate untimed and/or timed position, orientation, and/or motion information with the captured media. In one embodiment, metadata component 118 associates this information with the captured media as described in FIG. 3 below.

In some embodiments, electronic device 100 can include one or more instances of communications circuitry for connecting to a communications network and to transmit communications (e.g., voice or data) from the electronic device 100 to other devices within the communications network. The communications circuitry can be operative to interface with the communications network using any suitable communications protocol such as, for example, Wi-Fi (e.g., a 802.11 protocol), Bluetooth®, radio frequency systems (e.g., 900 MHz, 2.4 GHz, and 5.6 GHz communication systems), infrared, GSM, GSM plus EDGE, CDMA, quad-band, and other cellular protocols, VOIP, or any other suitable protocol.

In some embodiments, electronic device 100 can include a bus operative to provide a data transfer path for transferring data to, from, or between control processor 102, storage 104, memory 106, input/output circuitry 108, positioning circuitry 110, lens 112, orientation sensing component 114, motion sensing component 116, metadata component 118, and any other component included in the electronic device.

Using the positioning circuitry and its related components (e.g., the orientation sensing component 114 and/or the motion sensing component 116), the electronic device can receive position, orientation, and/or motion information at any suitable time. As used in the following discussion, location information will be understood to include position, orientation, and/or motion information, as well as any other information describing the positioning of the electronic device. In some embodiments, the positioning circuitry can only be enabled at particular times to ensure that battery and other electronic device resources are conserved. When enabled, the positioning circuitry can provide position information at any suitable interval. For example and in one embodiment, the positioning circuitry can provide continuous, substantially continuous, or intermittent position information as an electronic device performs a video recording.

Figure 1B:
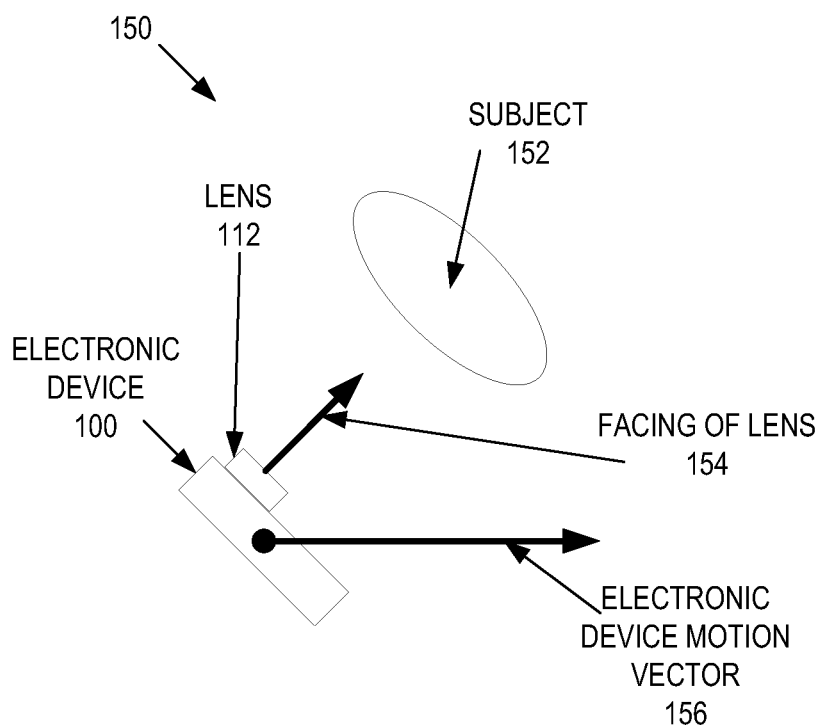
FIG. 1B is a block diagram of an illustrative electronic device capturing an image of a subject, an orientation of a lens, and a motion of the electronic device.

FIG. 1B is a block diagram of an illustrative electronic device 100 capturing an image of a subject, an orientation of a lens 112 of the electronic device 100, and a motion of the electronic device. In FIG. 1B, the electronic device 100 captures media through lens 112 of a subject 152. In one embodiment, the media is video, audio, a still picture, etc. or a combination thereof. In one embodiment, the electronic device 100 captures the orientation 154 of the lens 112. In one embodiment, the orientation 154 is how the lens is facing the subject 152. For example and in one embodiment, the orientation 154 is an absolute direction of the lens 112 relative to a fixed point or axis (e.g., absolute North Pole, magnetic north pole, etc.). In alternate embodiments, the orientation of the lens 112 is an elevation of the lens 112 relative to a fixed plane (e.g., relative to the horizon). In another embodiment, the electronic device 100 captures the motion 156 of the electronic device 156. In this embodiment, the motion 156 of the electronic device is the change in orientation of the device or the direction in which the device is moving. In a further embodiment, the speed of the device can be derived from the change in position of the device. In another embodiment, the device includes a component (not illustrated) to directly measure the speed of the device.

Any suitable type of location information can be stored as metadata in the video file. In some embodiments, position information can be specified as an ISO 6709 string formatted as specified by ISO 6709: 2008 Standard representation of geographic point position by coordinates, issued by the International Organization for Standardization. For example and in one embodiment, strings of information in UTF-8 format can be provided in metadata boxes. The boxes can use a null-termination on the string, or instead string characters can entirely fill the box.

Figure 2A:
FIG. 2A is a schematic view of an illustrative metadata structure including several boxes in accordance with one embodiment of the invention.

The metadata can include any suitable type of field to store the different metadata components. FIG. 2A is a schematic view of an illustrative metadata structure 200 in accordance with one embodiment of the invention. Structure 200 can include several boxes containing metadata strings. In one embodiment, a box is a field in the metadata structure

200. For example and in one embodiment, structure 200 can include name box 202, body box 204, note box 206, role box 208, 8601 box 210, face box 212, and move box 214. In some embodiments, structure 200 can include some of these boxes, other types of boxes or both (e.g., also include a 6709 box providing position information in a format set by ISO 6709). In addition, the names of the boxes of structure 200 can vary in different implementations. Name box 202 can be used to store a user-entered string name for the location of the video (e.g., the location at which the video was recorded, for example "Sweden" or "Grandma's House"). Body box 204 can be used to store a string naming the astronomical body from which the video was recorded. If body box 204 is not present, the string value "Earth" can be assumed. Body box 204 may have a value if the identified body has a well-defined coordinate system.

Note box 206 can be used to store a text string for a user-entered note related to the video. For example and in one embodiment, the note can be a description of the video, information providing context for the video, information identifying people or objects of the video, or any other user-entered information (e.g., "following a raccoon"). Role box 208 can be used to store a single byte, binary value having a value associated with a specific role. For example and in one embodiment, the value 0 can indicate a shooting location, the value 1 can indicate a real location, and the value 2 can indicate a fictional location. Other values for the byte can be reserved for future use. 8601 box 210 can be used to store a date and time, using a string extended format set by ISO 8601: 2004 Data elements and interchange formats—Information interchange—Representation of dates and times, available from the International Organization for Standardization. The date/time string of 8601 box 210 can represent the time and date at which the position information was gathered. In one embodiment, a start and stop time of the media recording can be included in the metadata.

Face box 212 can be used to store a string including an indication of the facing direction of the recorded video, and can include one or two angles. Move box 214 can used to store a string indicating the motion direction of the recorded video. For example and in one embodiment, the motion is the change in orientation of the device or the direction in which the device is moving and can include one or two angles. The two angles can be separated in the boxes 212 and 214 using any suitable approach, including for example by a slash. The first angle can include a compass angle (e.g., determined from an orientation sensing component 114), expressed in any suitable quantifiable manner. For example and in one embodiment, the angle can be expressed in degrees and decimal degrees, optionally preceded by the characters "+" or "−", and optionally followed by the character "M," where the character "M" indicates a magnetic heading. The direction (e.g., the angle value) can be determined as accurately as possible, such that the nominal due north (zero degrees) is defined as facing along a line of longitude of the location system. If the angle is followed by the "M" character, the value can be understood to indicate a magnetic heading instead of a heading relative to a line of longitude of the location system.

The second angle can include an elevation direction (e.g., determined from the orientation sensing component 114), expressed in any suitable quantifiable manner. For example and in one embodiment, the angle can be expressed in degrees and decimal degrees between +90.0 and −90.0, with 0 being horizontal (level), +90.0 being straight up, and −90.0 being straight down. For the +90.0 and −90.0 elevation angles, the compass direction can be irrelevant. The following is an example of a string that can be stored in one of face box 212 and move box 214: "+20.34M/−5.3," indicating a heading of 20.34° magnetic, looking or going down at 5.3° below the horizontal.

The location metadata can be generated from the positioning circuitry output and stored at any suitable time. In one embodiment, the location metadata is stored in a user data box within the media (e.g., the 'udta' box of a 'moov' box in a QuickTime media file). In some embodiments, the location metadata can be generated and stored once per video file (e.g., once per video clip). In these embodiments, the location metadata is untimed. The location metadata can be stored using any suitable approach. For example and in one embodiment, in extensible iTunes™ media file metadata format, the location metadata can be stored as UserData text in the classic UserData format. The key for the location metadata can be '©xyz,' and the value for the location metadata can be an ISO 6709 string as specified above in connection with structure 200 (e.g. "+27.5916+086.5640+8850/"). In some embodiments, ancillary location metadata can be stored in UserData, for example as a set of data element atoms in a single UserData format item. As another example, in iTunes™ files, the location metadata can be stored in an extensible QuickTime™ metadata format. The key used can be, for example, "com.apple.quicktime.location.ISO6709," and the value for the location information can be an ISO 6709 string, as discussed above.

In some embodiments, the location metadata can instead be generated and stored several times within a single video file. In these embodiments, the location metadata is timed. The location metadata can be stored using any suitable approach, including for example in one or more location metadata tracks (e.g., using a handler type of 'meta,' as defined in part 12 of ISO/IEC 14496-12:2008: The ISO Base Media File Format, available from the International Organization for Standardization). The one or more location metadata tracks can, when possible and appropriate, be linked to the one or more tracks of the video file that they describe. In some cases, the location metadata tracks can use a track reference of type 'cdsc' (content describes). The one or more metadata tracks can use a null media header (e.g., 'nmhd'). A sample location metadata entry can include no 'extra' fields, and can have any suitable entry name. For example and in one embodiment, for ISO 6709-based location data (described above), the sample entry name can be '6709' (the codec type). The location metadata format can include a set of boxes, in which a '6709' box may be the initial box (e.g., it defines the location information). The 6709 box can be used to store an ISO 6709 string formatted as set by the ISO 6709 standard. Other boxes, for example, boxes shown in structure 200 (FIG. 2A), can be optional. While in this embodiment, the storage of the positional metadata is discussed, in alternate embodiments, the timed orientation and/or motion metadata can be stored in a similar fashion.

Figure 2B:
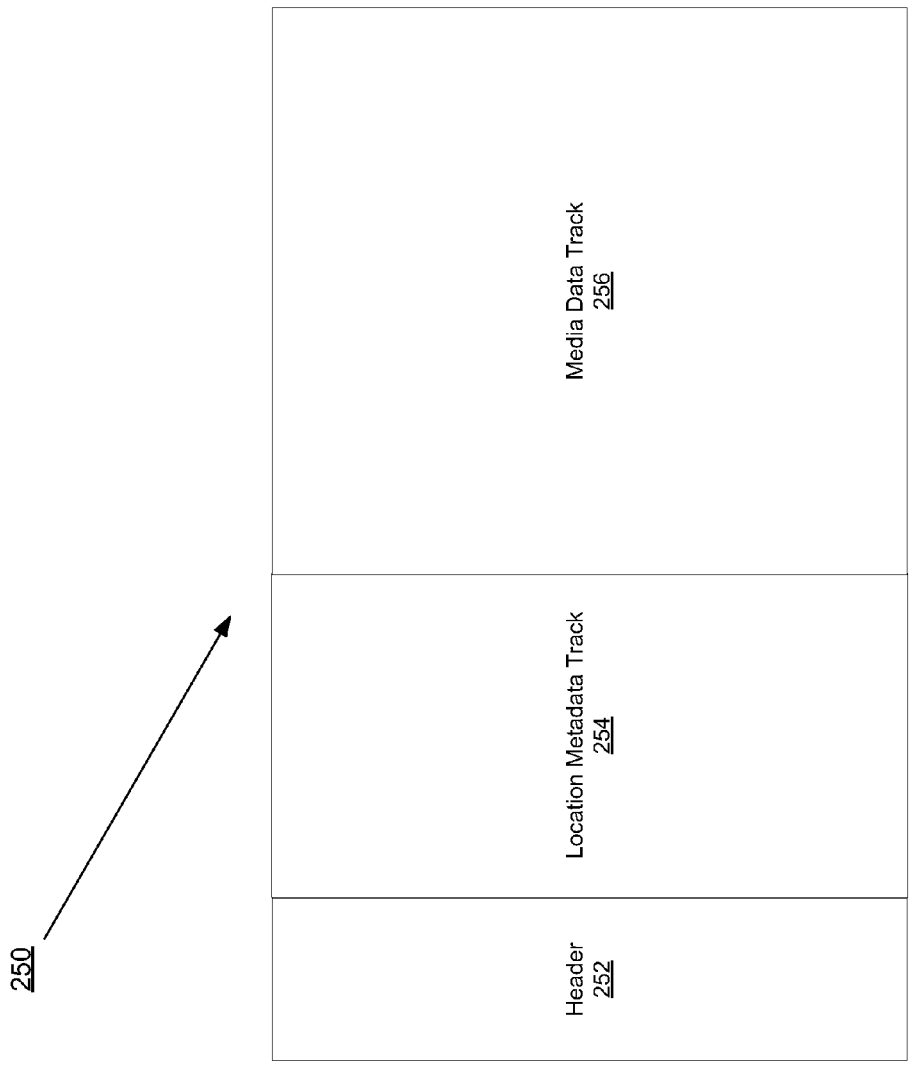
FIG. 2B is a block diagram of a media file that include a media data track and a location metadata track.

FIG. 2B is a block diagram of a media file 250 that include a media data track 256 and a location metadata track 254. In FIG. 2B, the media file 250 includes a header 252, location metadata track 254, and a media data track 256. The header 252 is supplemental information about the media file 250 that can be stored at the beginning of the media file 252. The location metadata track 254 is the track that stores the location metadata (e.g., the location, orientation, and/or motion information as described above with reference to FIG. 2A above. In one embodiment, location metadata track 254 is the metadata structure described above with reference to FIG. 2A. The media data track 254 is the track that stores the data for the media (e.g., video data, audio data, image, etc.).

Figure 3:
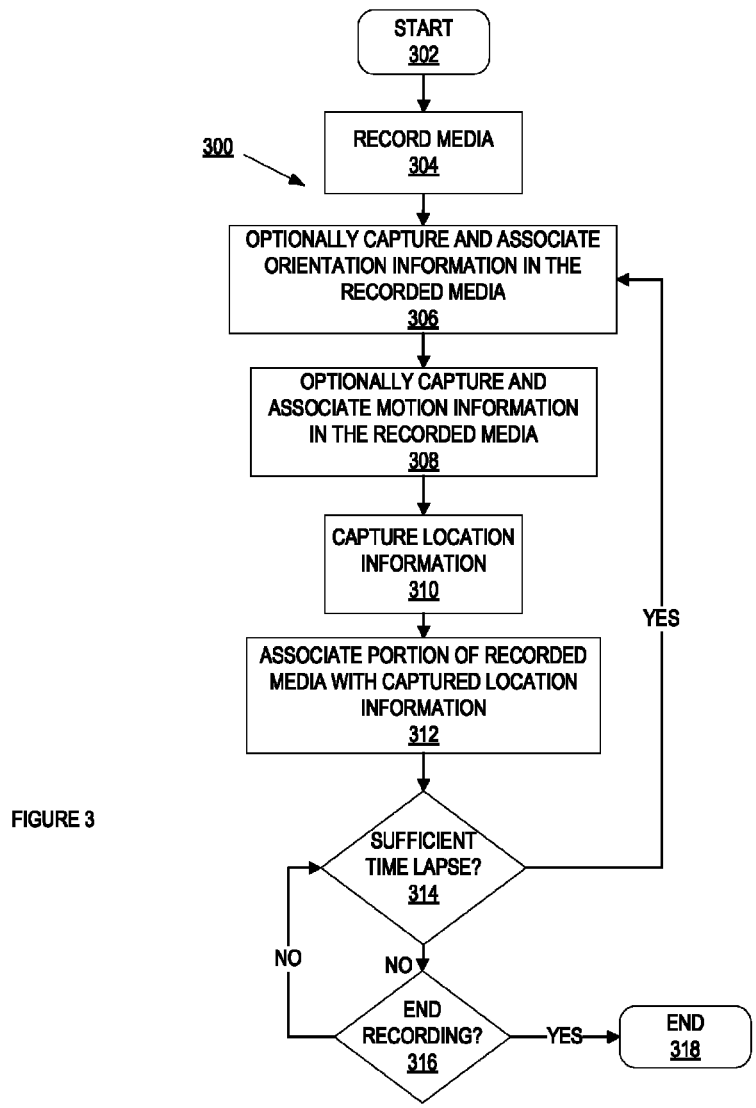
FIG. 3 is a flow diagram of one embodiment of a process to associate location metadata with media in accordance with one embodiment of the invention.

FIG. 3 is a flowchart of an illustrative process 300 for associating timed or untimed location metadata with a media file in accordance with one embodiment of the invention. As described above, the media file can be one of a video, audio, still image, other media type known in the art, and/or a combination thereof. In one embodiment, the metadata component 118 of the electronic device 100 can execute process 300 to associate location metadata with the captured media. Process 300 can begin at step 302. At step 304, process 300 records the media. For example and in one embodiment, an electronic device having a lens can record video, audio, still image, and/or a combination thereof as described in FIG. 1AB above. For example and in another embodiment, the electronic device can record video in response to receiving a user instruction.

Process 300 can optionally capture and associate the orientation information of the recorded media at step 306. In one embodiment, process 300 can record and associate the orientation information at the same and/or different rates as with the position data. For example and in one embodiment, process 300 records more than one metadata track where the rate of samples recorded varies from one track to another. As an example, if process 300 records position metadata once per second and motion and/or orientation twice per second, a track for the first might have samples only once per second and the second track recording motion metadata might have samples twice as frequently. In another embodiment, process 300 can associate the captured orientation information during or after media capture.

An alternative example is for process 300 to record in a single metadata track samples of the maximum frequency and duplicate metadata items (e.g., the position metadata, the motion metadata, and/or the orientation metadata) that are not changing as frequently in all intermediate samples. So, if there are position samples L1, L2, L3 in some time span and orientation samples O1, O2, O3, O4, O5, O6 in that same time span, process 300 might record the metadata as: {L1, O1}, {L1, O2}, {L2, O3}, {L2, O4}, {L3, O5}, {L3, O6} where the position metadata is duplicated so that there sufficient samples to hold the orientation metadata recordings. In one embodiment, process 300 captures the orientation information with the orientation sensing component 114 as described in FIG. 1AB above. Capturing and associating the orientation information is further discussed in FIG. 4 below.

At step 308, process 300 optionally captures and associates the motion information of the electronic device. In one embodiment, process 300 can record and associate the motion information at the same and/or different rates as with the position data. For example and in one embodiment, process 300 records more than one metadata track where the rate of samples recorded varies from one track to another. As an example, if process 300 records position metadata once per second and orientation and/or motion twice per second, a track for the first might have samples only once per second and the second track recording motion metadata might have samples twice as frequently. In another embodiment, process 300 can associate the captured motion information during or after media capture.

An alternative example is for process 300 to record in a single metadata track samples of the maximum frequency and duplicate metadata items (e.g., the position metadata, the motion metadata, and/or the orientation metadata) that are not changing as frequently in all intermediate samples. So, if there are position samples L1, L2, L3 in some time span and motion samples M1, M2, M3, M4, M5, M6 in that same time span, process 300 might record the metadata as: {L1, M1}, {L1, M2}, {L2, M3}, {L2, M4}, {L3, M5}, {L3, M6} where the position metadata is duplicated so that there sufficient samples to hold the motion metadata recordings. In one embodiment, process 300 captures the motion information with the motion sensing component 116 as described in FIG. 1AB above. Capturing and associating the motion information is further discussed in FIG. 5 below.

At step 310, process 300 captures the position information. In one embodiment, process 300 can capture position information with the electronic device 100 as described above in FIG. 1AB above. For example and in one embodiment, the electronic device can direct positioning circuitry to provide information depicting the current position of the device. This location information can be timed.

At step 312, process 300 associates a portion of the recorded media with the captured position information. For example and in one embodiment, process 300 can associate the particular media portion recorded at or around the same time that the position information was captured (e.g., based on common time stamps). Process 300 can associate the captured position information as the media is being recorded or after the media is recorded.

At step 314, process 300 determines whether sufficient time has lapsed since position information was last captured. The duration between capturing information can be fixed or vary, for example, based on detected device movement (e.g., shorter duration if the device moves a lot) or based on the power utilization of the device (e.g., reducing the capturing data from the position, motion, and/or orientation sensors if the device is operating in a low or reduce power state). For example and in one embodiment, the duration can be one of fixed time intervals (e.g. every 5 seconds, etc.), using a motion sensor to determine when movement occurs and addition position information is to be taken, comparing distances moved etc., or a combination thereof (e.g. record when moving 1/10 of a mile or more, or at least every 5 minutes). If process 300 determines that sufficient time has lapsed, process 300 returns to step 306 and capture new current position information for the device.

If, at step 314, process 300 determines that sufficient time has not lapsed, process 300 can move to step 316. At step 316, process 300 determines whether to end the recording. For example, process 300 can determine whether an instruction to end the recording was received. In another example, process 300 determines the electronic device has run out of space on the device to store the metadata. If process 300 determines that the recording should not end, process 300 returns to step 314 and determines whether sufficient time has lapsed. If, at step 316, process 300 determines that the recording should end, process 300 can move to step 318 and end.

As illustrated in FIG. 3, process 300 captures and associates timed position, motion, and/or orientation information with the captured media file. Alternate embodiments can have process 300 capturing and associating untimed position, motion, and/or orientation information. In one embodiment, process 300 can capture the position, motion, and/or orientation once during the media capture. In this embodiment, the position, motion, and/or orientation is untimed information. For example and in one embodiment, process 300 can capture the untimed information at the beginning, end, or somewhere in the middle of the media capture. In this embodiment, process 300 skips step 314 of FIG. 3.

In another embodiment, a mixture of timed and untimed information can be captured and associated. In this embodiment, one or more of the position, motion, and/or orientation information can be captured and associated as timed information and the other of the position, motion, and/or orientation information can be untimed information. For example and in one embodiment, process 300 can capture timed motion and/or orientation information and untimed position information. Alternatively, where the electronic device is moving during media capture with a single orientation, process 300 can capture timed position and motion information and untimed orientation information. In a further embodiment, process 300 can capture untimed position information and timed orientation and/or motion information.

Figure 4:
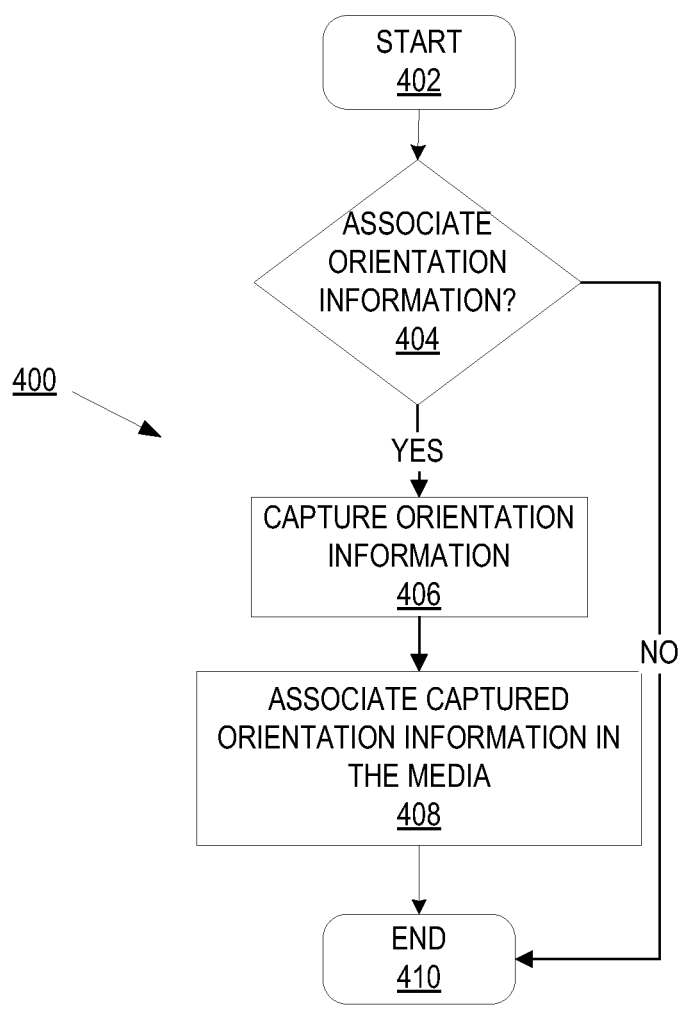
FIG. 4 is a flow diagram of one embodiment of a process to associate orientation information with the media in accordance with one embodiment of the invention.

FIG. 4 is a flow diagram of one embodiment of a process 400 to associate orientation information with the media. In one embodiment, process 400 is executed by process 300 at step 306 in FIG. 3 above. Process 400 starts at step 402. At step 404, process 400 determines whether to associate the orientation information of the media being recorded. If not, process 400 ends at step 410.

If process 400 determines to associate the orientation information with the recorded media, process 406 captures the orientation information at step 406. For example and in one embodiment, process 400 captures orientation information as described above in FIG. 1AB above. At step 408, process 400 associates the captured orientation information with the media. In one embodiment, process 400 associates the orientation information by correlating the captured orientation to the captured media information and storing that correlation in the media file. For example and in one embodiment, process 400 stores the orientation information in the face box 212 of metadata 200 as described in FIG. 2 above. As another example and in another embodiment, process 400 can associate the particular media portion recorded at or around the same time that the orientation information was captured (e.g., based on common time stamps). Process 400 ends at step 410.

Figure 5:
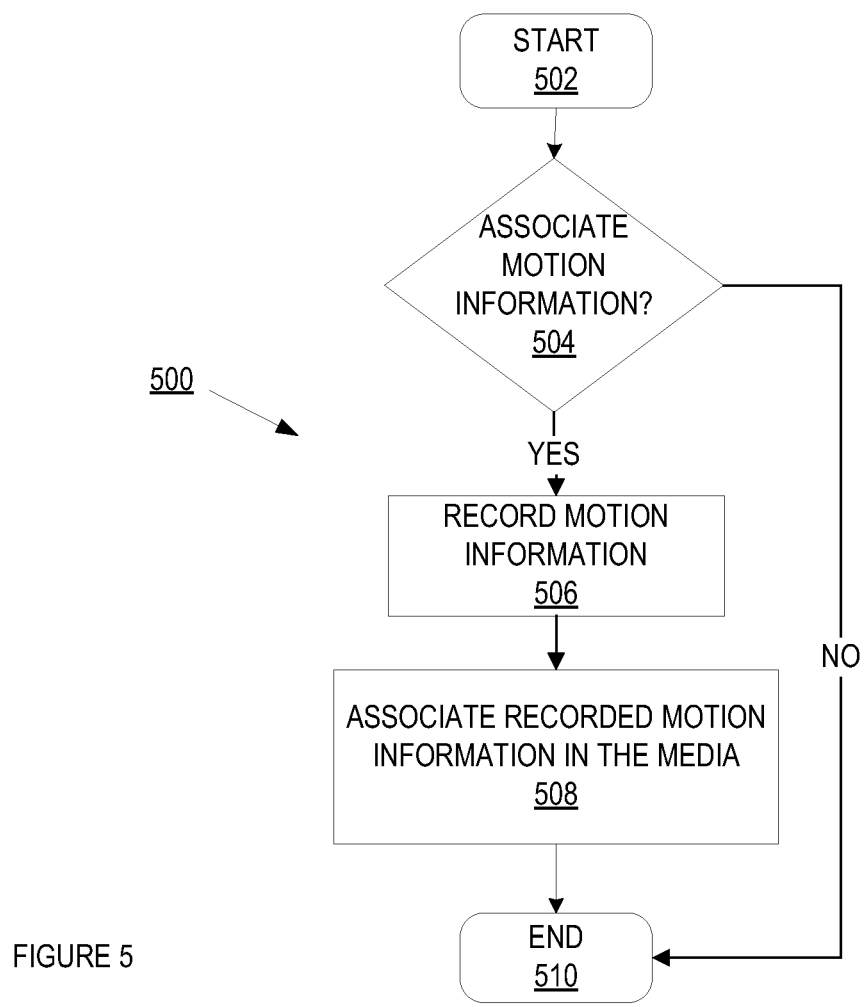
FIG. 5 is a flow diagram of one embodiment of a process to associate motion information with the media in accordance with one embodiment of the invention.

FIG. 5 is a flow diagram of one embodiment of a process 500 to associate motion information with the media. In one embodiment, process 500 is executed by process 300 at step 308 in FIG. 3 above. Process 500 starts at step 502. At step 504, process 500 determines whether to associate the motion information of the media being recorded. If not, process 500 ends at step 510.

If process 500 determines to associate the motion information with the recorded media, process 506 captures the motion information at step 506. For example and in one embodiment, process 300 captures motion information as described above in FIG. 1AB above. At step 508, process 500 associates the captured motion information with the media. In one embodiment, process 400 associates the motion information by correlating the captured motion to the captured media information and storing the correlation in the media. For example and in one embodiment, process 500 stores the motion information in the move box 212 of metadata 200 as described in FIG. 2 above. As another example and in another embodiment, process 500 can associate the particular media portion recorded at or around the same time that the motion information was captured (e.g., based on common time stamps). Process 500 ends at step 510.

Figure 6:
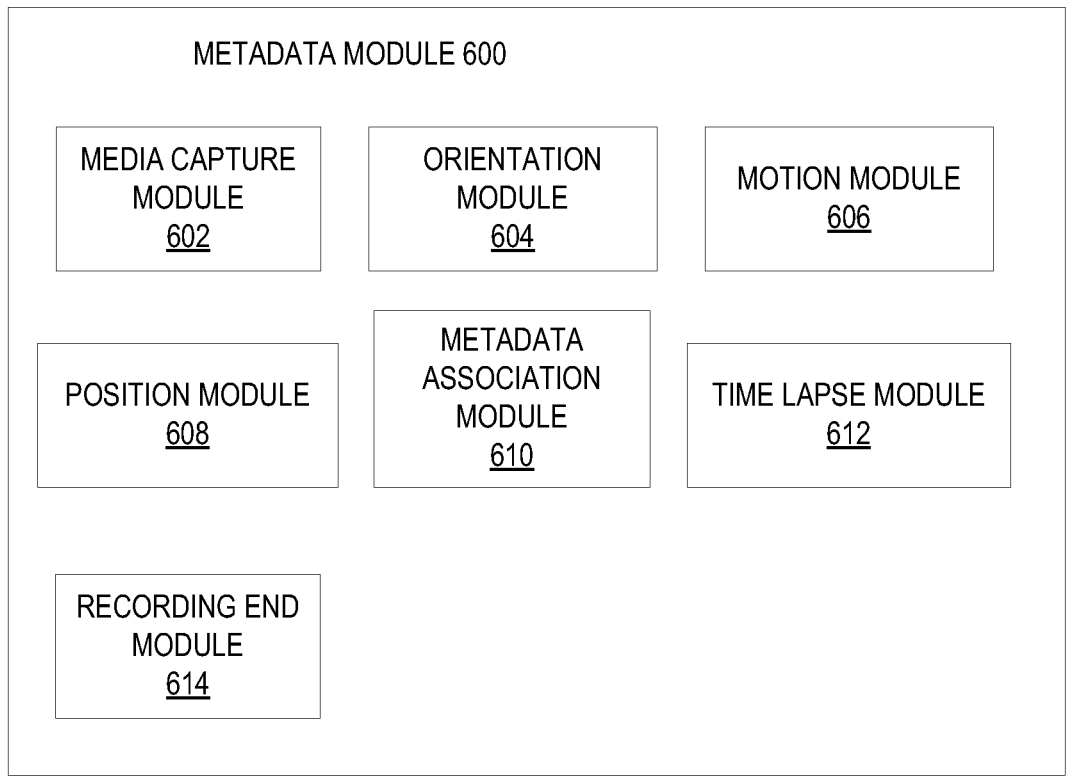
FIG. 6 is a block diagram of metadata component that associates location metadata with media in accordance with one embodiment of the invention.

FIG. 6 is a block diagram of metadata component 118/600 that associates location metadata with media in accordance with one embodiment of the invention. Metadata component 118/600 comprises media capture module 602, orientation module 604, motion module 606, position module 608, metadata association module 610, time lapse module 612, and recording end module 614. Media capture module 602 initiates the capturing of the media as described in FIG. 3, block 304. Orientation module 604 captures and associates the captured orientation information with the recorded media as described in FIG. 3, block 306. Motion module 606 captures and associates the captured motion information with the recorded media as described in FIG. 3, block 308. Position module 608 determines the current position of the electronic device as described in FIG. 3, block 310. Metadata association module 610 associates the position data with the captured media as described in FIG. 3, block 306. Time lapse module 612 determines if enough time has lapsed as described in FIG. 3, block 306. Recording end module 614 determines if the media recording has ended as described in FIG. 3, block 306.

Figure 7:
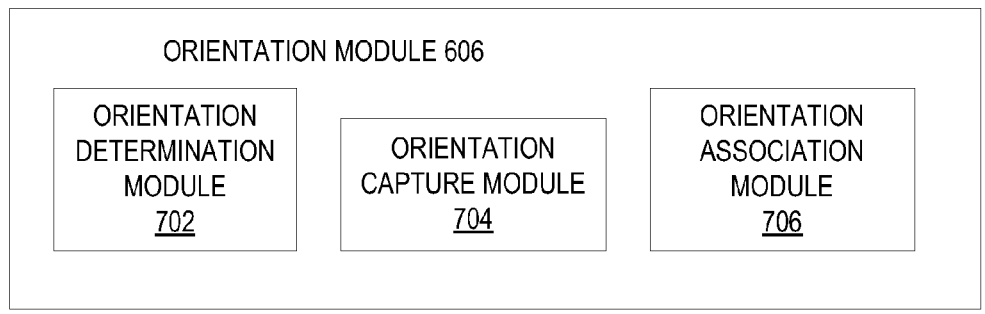
FIG. 7 is a block diagram of orientation module that associates orientation information with the media in accordance with one embodiment of the invention.

FIG. 7 is a block diagram of orientation module 604 that captures and associates orientation information with the media. Orientation module 604 includes orientation determination module 702, orientation capture module 704, and orientation associating module 706. Orientation determination module 702 determines whether to capture and associate the orientation module with the captured media as described in FIG. 4, block 404. Orientation capture module 704 captures the orientation information as described in FIG. 4, block 406. Orientation associating module 706 associates the captured orientation information with the captured media as described in FIG. 4, block 410.

Figure 8:
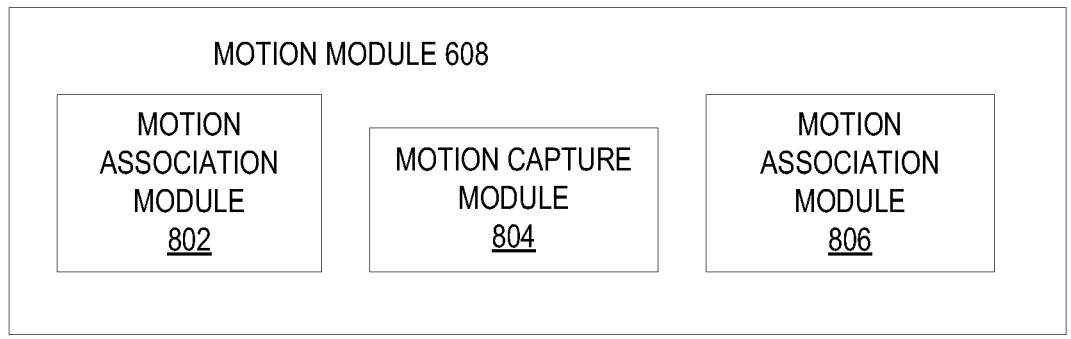
FIG. 8 is a block diagram of motion module that associates motion information with the media in accordance with one embodiment of the invention.

FIG. 8 is a block diagram of motion module 606 that captures and associates motion information with the media. Motion module 606 includes motion determination module 702, motion capture module 704, and motion associating module 706. Motion determination module 702 determines whether to capture and associate the motion module with the captured media as described in FIG. 5, block 504. Motion capture module 704 captures the motion information as described in FIG. 5, block 506. Motion associating module 706 associates the captured motion information with the captured media as described in FIG. 4, block 508.

As described above, in one embodiment, the location information (e.g., position, orientation, and/or motion data) can be stored in location metadata included in the media file. For example and in one embodiment, in Motion Pictures Expert Group (MPEG)-4 (MPEG4) media files, a third generation partnership project (3GPP) metadata field named 'loci' can be used to store the location metadata. In this embodiment, untimed or timed location information can be stored in this metadata field.

As another example, in some QuickTime™ media files, location metadata can be stored using an extensible metadata format. In this embodiment, the method of storing the metadata is extensible and allows for language and country tagging in the media file. Untimed or timed metadata can be stored in this embodiment. The metadata format uses a key/value pair for each type of metadata being stored. Common keys, with specific formats for the values they indicate, are defined below for one embodiment. Within a media file of this embodiment, metadata can be stored either a 'moov', a 'trak' box, or an atom. In one embodiment, a box is the same as an atom. In one embodiment, one of these metadata boxes is used for each location.

Figure 9:
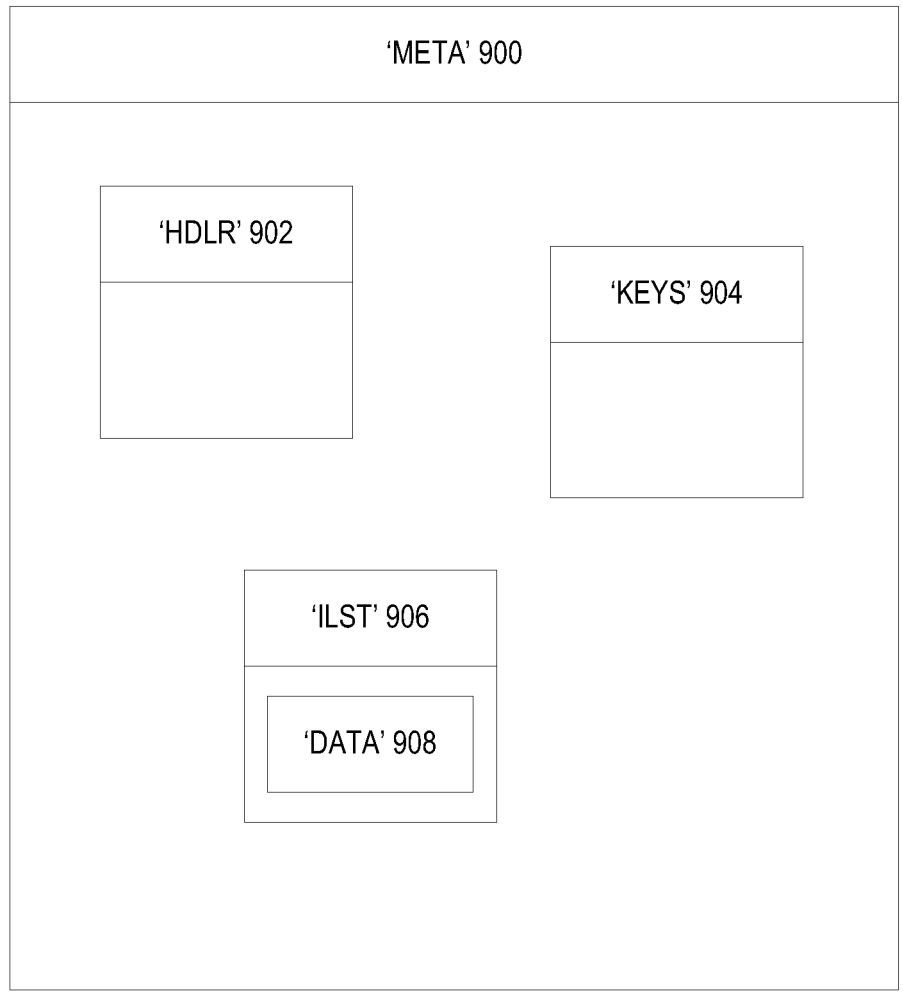
FIG. 9 is a block diagram of a metadata 'meta' box according to one embodiment of the invention.

The overall container for metadata is the 'meta' box. FIG. 9 is a block diagram of a metadata 'meta' box 900 according to one embodiment of the invention. In FIG. 9, 'meta' box 900 comprises the sub-boxes 'hdlr' 902, 'keys' 904, and 'ilst' 906. The metadata handler box Chide 902) defines a box structure used to signal the structure of metadata stored within the 'meta' box. The item keys box ('keys' 904) holds a list of metadata keys that may be present in the 'meta' box 900. The metadata 'ilst' box 906 holds a list of actual metadata values that are present in the 'meta' box. In one embodiment, the 'ilst' box 906 includes a 'data' box 908 to store the metadata values. Each of the sub-boxes 'hdlr' 902, 'keys' 904, and 'ilst' 906 is further described below. In another embodiment, 'meta' box 900 can include one or more of optional sub-boxes (not illustrated) 'ctry', 'lang', and 'free'. In one embodiment, the 'ctry' and 'lung' boxes can be used to store localized data, such as a country and language code, in an efficient manner. In another embodiment, the 'free' box is used to reserve space in a 'meta' box 900 for later additions to the 'meta' box 900, or to zero out bytes within a 'meta' box after editing and removing elements from the 'meta' box 900. In this embodiment, the 'free' box need not occur in another sub-box of the 'meta' box 900.

In one embodiment, the metadata box structure 'meta' 900 is an overall container for storing metadata. In this embodiment, this box structure is defined as:

```
aligned(8) class MetaDataBox extends Box('meta') {
}
```

In another embodiment, MPEG4 media files use a FullBox instead of a Box:

```
aligned(8) class MetaDataBox extends FullBox('meta', 0, 0) {
}
```

The metadata handler box Chide 902) defines a box structure used for the types of metadata stored within the 'meta' box. The 'hldr' 902 is defined as:

```
aligned(8) class HandlerBox extends FullBox('hdlr',
       version=0, 0) {
    unsigned int(32) pre_defined = 0;
    unsigned int(32) handler_type;
    const unsigned int(32)[3] reserved = 0;
    string name;
}
```

The handler_type is a 32-bit integer indicating structure used in the metadata box. For the location metadata, the handler_type is 'mdta'. The name field is a null-terminated string in Unicode Transformation Format (UTF)-8 characters which gives a human-readable name for the metadata type (e.g., for debugging and inspection purposes). The string may be empty, e.g., a single byte with a value of 0.

Figure 10:
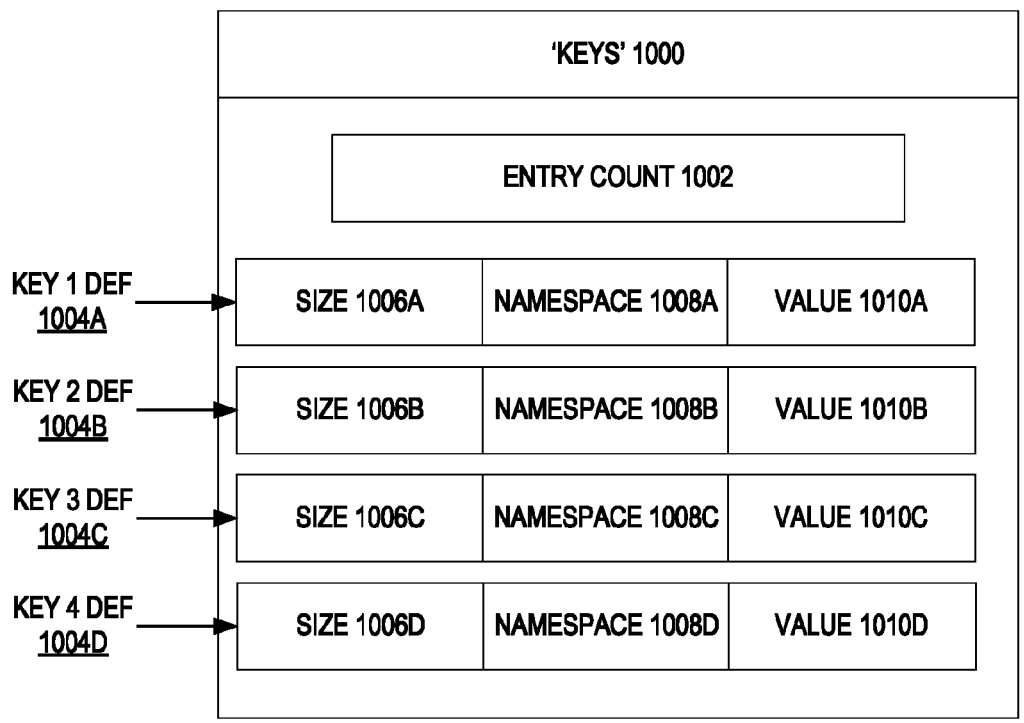
FIG. 10 is a block diagram of a metadata 'keys' box according to one embodiment of the invention.

The item keys box ('keys' 904) holds a list of metadata keys that may be present in the 'meta' box 900. FIG. 10 is a block diagram of a metadata 'keys' box 1000 according to one embodiment of the invention. In one embodiment, metadata 'keys' box 1000 is the item keys box 904 as described in FIG. 9. In one embodiment, this list is indexed, starting with one, as zero is a reserved value. The 'keys' box 1000 has the following structure:

```
aligned(8) class ItemKeysBox extends FullBox('keys', 0, 0) {
    int i;
    unsigned int(32) entry_count;
```

```
    for (i = 1; i <= entry_count; i++) {
        unsigned int(32) key_size;
        unsigned int(32) key_namespace;
        unsigned int(32) key_value[key_size - 8];
    }
}
```

Entry_count 1002 is the number of entries in the 'keys' box 1000. Each entry in the 'keys' box 1000 has a key definition 1004A-D. Each key 1004A-D has a structure of key_size 1006A-D, key_namespace 1008A-D, and key_value 1010A-D. The key_size 1006A-D is the size of the entire structure containing a key definition. Therefore, key_size= sizeof(key_size)+sizeof(key_namespace)+sizeof(key_ value). Since key_size 1006A-D and key_namespace 1008A-D are both 32-bit integers, together they have a size of eight bytes. Hence, the key_value 1010A-D structure size is key_size−8. The key_namespace 1008A-D defines the naming scheme used for metadata keys. For the location metadata keys, the key_namespace 1010A-D is equal to 'mdta'. The key_value 1010A-D contains the actual name of the metadata key. Keys within the 'mdta' coordinates can use a metadata key_value 1010A-D of "com.apple.quicktime.location.ISO6709."

Figure 11:
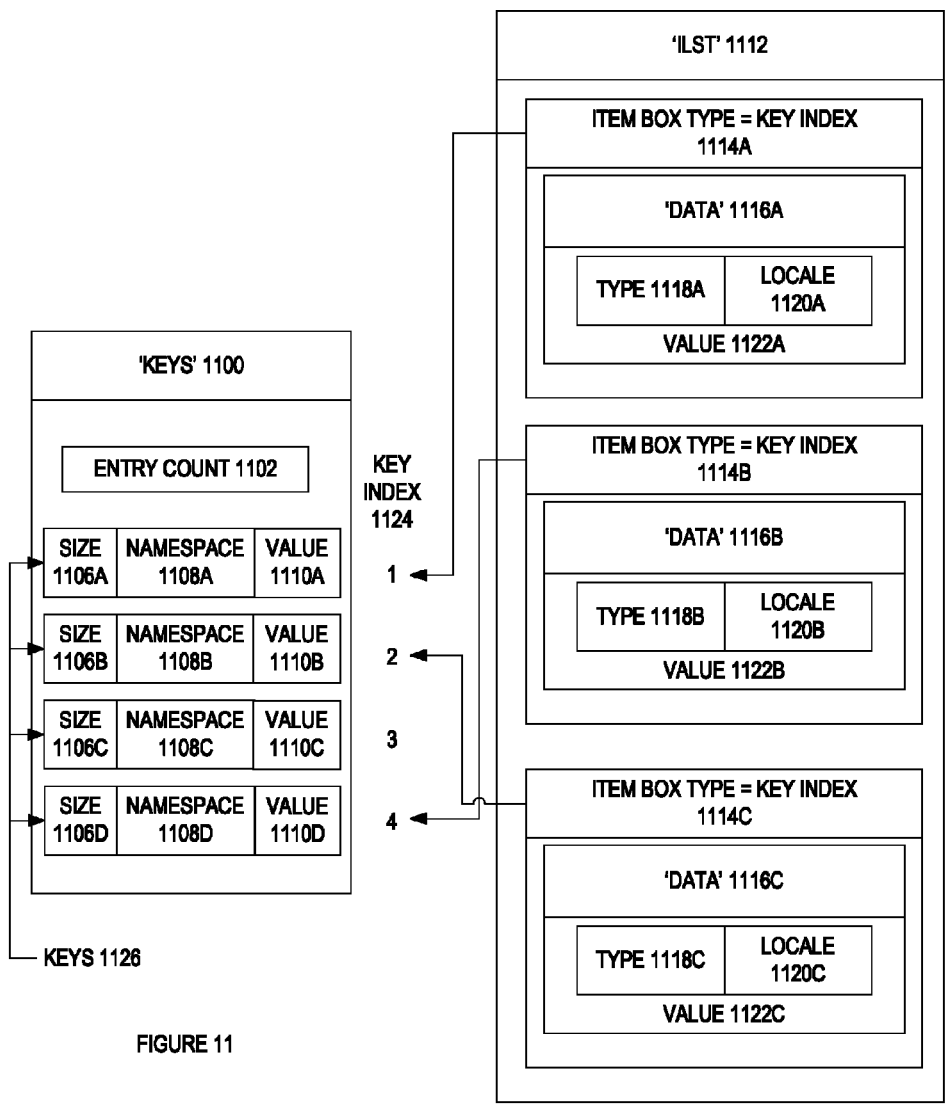
FIG. 11 is a block diagram of a metadata 'ilst' box with entries linked to entries in the 'keys' box according to one embodiment of the invention.

As described above, the 'ilst' box stores the metadata values. FIG. 11 is a block diagram of a metadata 'ilst' box 1112 with entries linked to entries in the 'keys' box 1100 according to one embodiment of the invention. As described above in the FIG. 10, the 'keys' box 1100 holds a list of metadata keys that may be present in the 'meta' box 900. In one embodiment, the 'keys' box 1100 includes an entry count 1102 of the number of keys in the 'keys' box 1100. In addition, each of the keys 1126, includes a size 1106A-D, namespace 1108A-D, and value 1110A-D as described above in FIG. 10. The metadata 'ilst' box 1112 holds a list of actual metadata values that are present in the 'meta' box. The metadata items are formatted as a list of items 1114A-C. The item list box 'ilst' 1112 includes a number of metadata items metadata items, each of which is a box.

```
aligned(8) class MetaItemsBox extends Box('ilst') {
    MetaItemBox item[ ];
}
```

The item list box 'ilst' 1112 contains one field, an array of MetaItemBox named item. This array is illustrated in FIG. 11 as the three ItemBoxTypes 1114A-C. Each of the Item Box Types 1114A-C includes a value for the metadata and is linked via a key index 1124 to a corresponding entry in the 'keys' box 1100. In one embodiment, the key index 1124 is an index of the keys in the 'keys' box 1100. The Item Box has a structure of:

```
aligned(8) class MetaItemBox extends Box(key_type_index) {
    ValueBox the_value;
}
```

The key_type_index is the 1-based index into the 'keys' box list 1110 of metadata keys represented in the 'meta' box of the metadata entry. The the_value field is a box for containing the value of the metadata.

The value of the metadata is expressed as immediate data in a 'data' box 1116A-C. The 'data' box 1116A-C starts with two fields: a type indicator and a locale indicator. Both the type and locale indicators can be four bytes long. In one embodiment, there may be multiple 'value' entries, using the same and/or different type, country or language codes. The Value Box 1122A-C structure is:

```
aligned(8) class ValueBox extends Box(value_type) {
    type_indicator      the_type;
    locale_indicator    the_locale;
}
```

The type indicator 1118A-C is formed of four bytes split between to fields. The first byte indicates the set of types from which the type is drawn. The second through four bytes forms the second field and its interpretation depends on the value in the first field. In one embodiment, the indicator bytes has a value of zero to indicate the type is drawn from a well-know set of types (see Table 1). In this embodiment, the other values for the first byte are reserved. The structure of the Type Indicator 1118A-C is:

```
aligned(8) class TypeIndicator {
    unsigned int(8)     type_index_space;
    switch (type_index_space) {
        case 0:
            unsigned int(24)    well_known_type;
            break;
    }
}
```

If the type indicator byte is zero, the following 24 bits holds the well-known type (see Table 1).

TABLE 1

Well-Known Types.

| Code | Type | Comment |
|---|---|---|
| 0 | Reserved | Reserved for use where no type needs to be indicated |
| 1 | UTF-8 | Without count of null terminator |
| 2 | UTF-16 | Also known as UTF-16BE |
| 4 | UTF-8 sort | Variant storage of a string for sorting |
| 5 | UTF-16 sort | Variant storage of a string for sorting |
| 13 | JPEG | In a JFIF wrapper |
| 14 | PNG | In a PNG wrapper |
| 21 | Integer | A signed integer in 1, 2, 3, or 4 bytes |
| 22 | BE Unsigned Integer | A big-endian unsigned integer in 1, 2, 3, or 4 bytes. Size of value determines integer size. |
| 23 | BE Float32 | A big-endian 32-bit floating point vale (IEEE754) |
| 24 | BE Float64 | A big-endian 64-bit floating point vale (IEEE754) |
| 27 | BMP | Windows bitmap format graphics |
| 28 | QuickTime Metadata Box | A block of data having the structure of the MetaDataBox discussed above |

The locale indicator 1120A-C is formatted as a four byte value. It is formed from two two-byte values: a country indicator and a language indicator. In each case, the two-byte field has the following possible values:

0 this box provides the default value of this datum for any locale not explicitly listed 1<=n<=255 reserved Otherwise the value is an ISO 3166 code (for the country code) or a packed ISO 639-2/T code (for the language). Note that both the ISO 3166 and ISO 639-2/T codes have a non-zero value in their top byte.

Software applications that read metadata may be customized for a specific set of countries or languages. If a metadata writer does not want to limit a metadata item to a specific set of countries, the reserved value "ZZ" from ISO 3166 should be used as its country code. Similarly, if the metadata writer does not want to limit a metadata item to a specific set of languages, the reserved value "und" from ISO 639-2/T should be used as its language code.

In this embodiment, a software application matches a country code if the value is match to zero or the codes are equal. A software application matches to a list of codes if its value is a member of that list. A software application matches to a locale if both country and language match.

Some example metadata tags are:

| Country | Language | Meaning |
|---|---|---|
| 0 | eng | All speakers of English, irrespective of country |
| GB | 0 | All people in the United Kingdom, irrespective of language |
| CA | fra | French speakers in Canada |

The locale indicator structure is:

```
aligned(8) class LocaleIndicator {
    unsigned int(16)    country_indicator;
    unsigned int(16)    language_indicator;
}
```

The 'data' box contains the four bytes each of type and locale indicators as well as the actual value 1122A-C of the metadata, formatted, as required by the type:

```
aligned(8) class ImmediateValueBox extends ValueBox ('data')
{
    unsigned int(8)     value [ ];
}
```

In this embodiment, the array value stores the value of the data as an array of two bytes integers.

In one embodiment, multiple values for the same tag represent multiple representations of the same information, differing either by language or storage type, or by the size or nature of the data. In one embodiment, the data is ordered in each item from the most-specific to the most general.

An example of the storage of location metadata as defined in ISO 6709 is given below:

```
<len>meta
    <len>hdlr
        The metadata structure - 'mdta'
    <len>keys
        'mdta'com.apple.quicktime.location.ISO6709
    <len>ilst
        <len>keyindex
            <len>data
                type    well-known type, Unicode text
                loc     1, the default notice
                ...     the global coordinates string:
                        "+27.5916+086.5640+8850/"
```

Note that "<len>" indicates an appropriate box length or size for each item.

Table 2 is an exemplary list of metadata keys that can be used to store location metadata.

| Key | Key Type | Value Payload | Definition | Example |
| --- | --- | --- | --- | --- |
| com.apple.quicktime.location.ISO6709 | 'mdta' | Defined in ISO6709 | Geographic point position by coordinates as defined in ISO6709 | "+27.5916 +086.5640 +8850/" |
| com.apple.quicktime.location.name | 'mdta' | An UTF-8 string (value type 1). Can have multiple values with different language and country code designations. | Name of the location. | "Sweden" or "Grandmother's house" |
| com.apple.quicktime.location.body | 'mdta' | An UTF-8 string (value type 1). Can have multiple values with different language and country code designations. | The astronomical body (as if for easy conversion to the 3GPP format); 'earth' is assumed if this box is not present | "earth" |
| com.apple.quicktime.location.note | 'mdta' | An UTF-8 string (value type 1). Can have multiple values with different language and country code designations. | Descriptive comment. | "following a dog" |
| com.apple.quicktime.location.role | 'mdta' | An unsigned integer value (value type 22) | A single byte, binary value, containing a value from the set: 0 indicating "shooting location", 1 indicating "real location", and 2 indicating "fictional location". Other values are reserved. | 1, for shooting location |
| com.apple.quicktime.location.date | 'mdta' | Defined in ISO8601. | A date/time, using the string extended format from ISO8601, that represents the time at which the position information was gathered | "2010-02-24T17:56Z", for a date of Feb. 24, 2010, time of 17:56 UTC." |
| com.apple.quicktime.location.facing | 'mdta' | An UTF-8 string (value type 1). Can have multiple values with different language and country code designations. | An indication of the direction the camera is facing during the shot. | "+20.34M/−5.3" for a heading of 20.34° magnetic, looking or going down at 5.3° below the horizontal. |
| com.apple.quicktime.location.motion | 'mdta' | An UTF-8 string (value type 1). Can have multiple values with different language and country code designations. | An indication of the direction the camera is moving in during the shot. | "+20.34M/−5.3" for a heading of 20.34° magnetic, looking or going down at 5.3° below the horizontal. |

Figure 12:
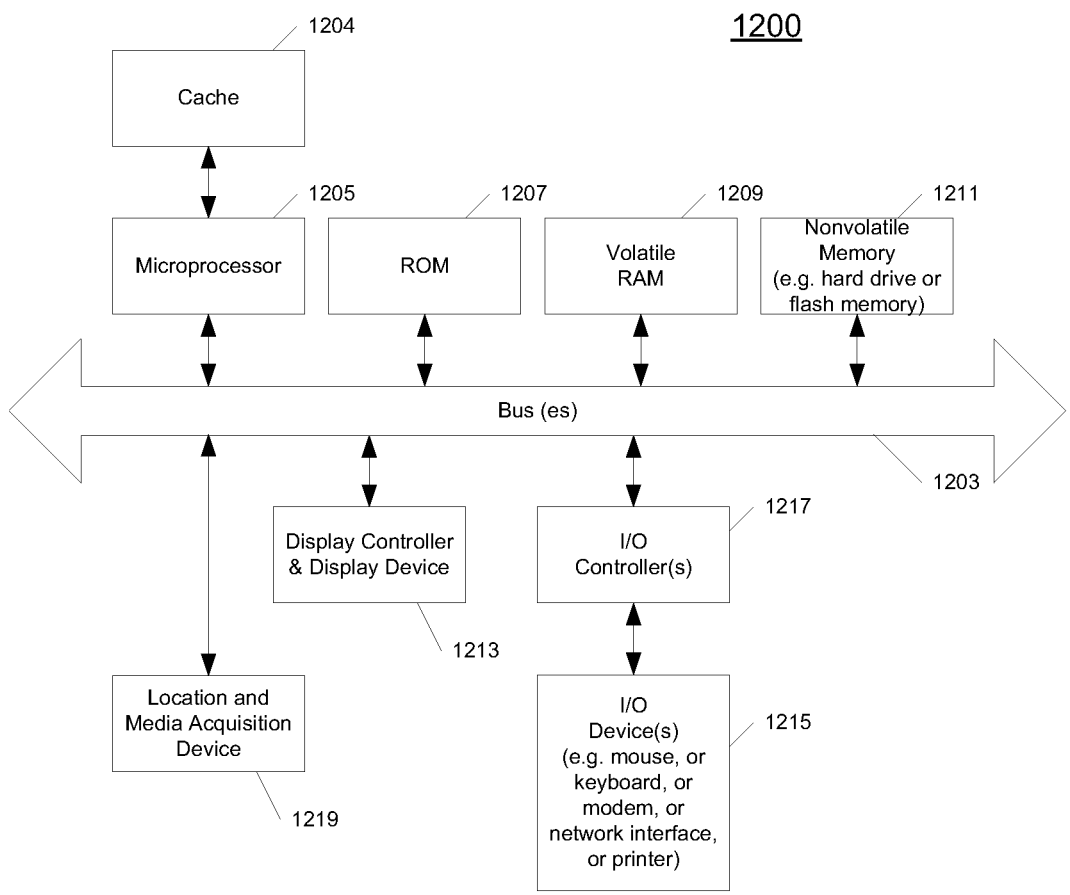
FIG. 12 illustrates one example of a typical computer system which may be used in conjunction with the embodiments described herein.

FIG. 12 shows one example of a data processing system 1200, which may be used with one embodiment of the present invention. For example and in one embodiment, the system 1200 may be implemented including a host as shown in FIG. 1. Note that while FIG. 12 illustrates various components of a computer system, it is not intended to represent any particular architecture or manner of interconnecting the components as such details are not germane to the present invention. It will also be appreciated that network computers and other data processing systems or other consumer electronic devices which have fewer components or perhaps more components may also be used with the present invention.

As shown in FIG. 12, the computer system 1200, which is a form of a data processing system, includes a bus 1203 which is coupled to a microprocessor(s) 1205 and a ROM (Read Only Memory) 1207 and volatile RAM 1209 and a non-volatile memory 1211. The microprocessor 1205 may retrieve the instructions from the memories 1207, 1209, 1211 and execute the instructions to perform operations described above. The bus 1203 interconnects these various components together and also interconnects these components 1205, 1207, 1209, and 1211 to a display controller and display device 1213 and to peripheral devices such as input/output (I/O) devices which may be mice, keyboards, modems, network interfaces, printers and other devices which are well known in the art. Typically, the input/output devices 1215 are coupled to the system through input/output controllers 1217. The volatile RAM (Random Access Memory) 1209 is typically implemented as dynamic RAM (DRAM) which requires power continually in order to refresh or maintain the data in the memory.

The mass storage 1211 is typically a magnetic hard drive or a magnetic optical drive or an optical drive or a DVD RAM or a flash memory or other types of memory systems which maintain data (e.g. large amounts of data) even after power is removed from the system. Typically, the mass storage 1211 will also be a random access memory although this is not required. While FIG. 12 shows that the mass storage 1211 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1203 may include one or more buses connected to each other through various bridges, controllers and/or adapters as is well known in the art. Computer system 1200 further includes a location and media acquisition device 1219. In one embodiment, the location and media acquisition device is an electronic device tethered to the computer system 1200, such as the electronic device 100 of FIG. 1AB above. In another embodiment, location and media acquisition device 1219 is a device integrated into the computer system 1200 and can capture media and position, orientation, and motion information. Furthermore, this device 1219 can associate the position, orientation, and motion information with the captured media as described in FIG. 3 above.

Figure 13:
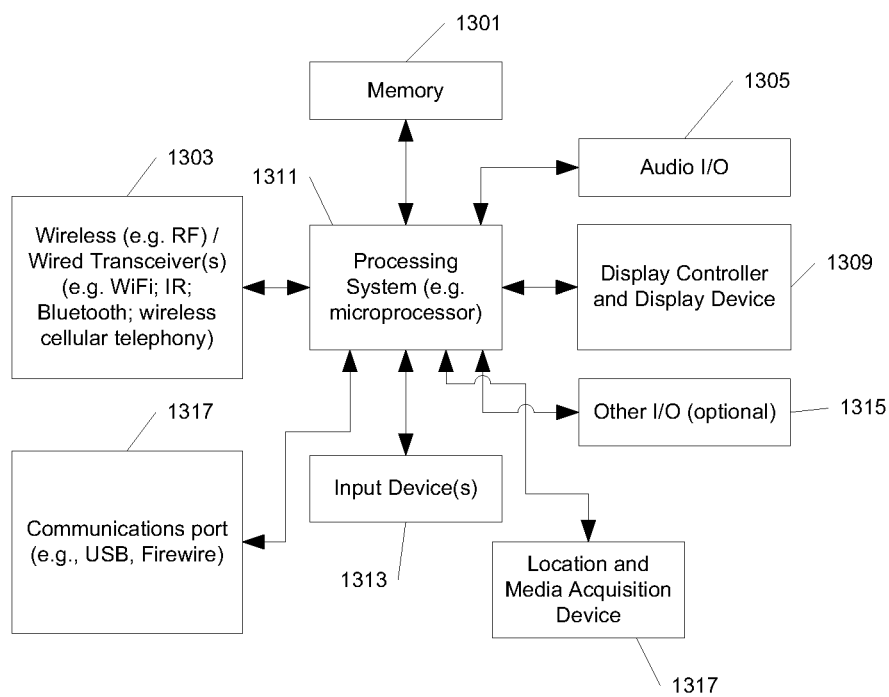
FIG. 13 shows an example of a data processing system which may be used with one embodiment of the present invention

FIG. 13 shows an example of another data processing system 1300 which may be used with one embodiment of the present invention. For example and in one embodiment, system 1300 may be implemented as a portable storage device as shown in FIG. 1. The data processing system 1300 shown in FIG. 13 includes a processing system 1311, which may be one or more microprocessors, or which may be a system on a chip integrated circuit, and the system also includes memory 1301 for storing data and programs for execution by the processing system. The system 1300 also includes an audio input/output subsystem 1305 which may include a microphone and a speaker for, for example, playing back music or providing telephone functionality through the speaker and microphone.

A display controller and display device 1307 provide a visual user interface for the user; this digital interface may include a graphical user interface which is similar to that shown on a Macintosh computer when running OS X operating system software. The system 1300 also includes one or more wireless transceivers 1303 to communicate with another data processing system, such as the system 1300 of FIG. 13. A wireless transceiver may be a WLAN transceiver, an infrared transceiver, a Bluetooth transceiver, and/or a wireless cellular telephony transceiver. It will be appreciated that additional components, not shown, may also be part of the system 1300 in certain embodiments, and in certain embodiments fewer components than shown in FIG. 13 may also be used in a data processing system. The system 1300 further includes one or more communications ports 1317 to communicate with another data processing system, such as the electronic device 130 of FIG. 9. The communications port may be a USB port, Firewire port, Bluetooth interface, etc.

The data processing system 1300 also includes one or more input devices 1313 which are provided to allow a user to provide input to the system. These input devices may be a keypad or a keyboard or a touch panel or a multi touch panel. The data processing system 1300 also includes an optional input/output device 1315 which may be a connector for a dock. It will be appreciated that one or more buses, not shown, may be used to interconnect the various components as is well known in the art. The data processing system shown in FIG. 13 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 1300 may be a network computer or an embedded processing device within another device, or other types of data processing systems which have fewer components or perhaps more components than that shown in FIG. 13.

Data processing system 1300 further includes a location and media acquisition device 1317. In one embodiment, the location and media acquisition device is an electronic device tethered to the data processing system 1300, such as the electronic device 130 of FIG. 1AB above. In another embodiment, location and media acquisition device 1317 is a device integrated into the computer system 1300 and can capture media and position, orientation, and motion information. Furthermore, this device 1317 can associate the position, orientation, and motion information with the captured media as described in FIG. 3 above.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "capturing," "associating," "determining," "correlating," "linking," "defining," "storing," 'selecting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method of generating a media file having timed location metadata, the method comprising:
   capturing, with an electronic device having a lens, a recording of media over a period of time, wherein the electronic device is moving among a plurality of different positions during the recording;
   measuring, by a motion sensor of the electronic device, movement of the electronic device;
   for each of a plurality of intervals during the recording:
      determining, with the electronic device, a distance that the electronic device moves during the interval based on data measured by the motion sensor;
      at a variable time determined based on the distance moved by the electronic device, determining, with positioning circuitry of the electronic device, a position associated with the captured media, the position corresponding to one of the plurality of different positions; and
   storing, with the electronic device, the captured media and a plurality of determined positions corresponding to the plurality of intervals in the media file comprising at least two tracks, wherein the captured media is stored in a first track and the plurality of determined positions are stored in a second track, wherein each portion of the media being captured during each of the plurality of intervals corresponds to one of the plurality of determined positions.

2. The non-transitory machine-readable medium of claim 1, wherein the method further comprises:
   determining each of the plurality of determined positions using one or more of a global positioning system, wireless-assisted global positioning system, a measurement of a network signal of the electronic device, and a tracking information from a known point.

3. The non-transitory machine-readable medium of claim 1, wherein the method further comprises:
correlating one of a plurality of distinct portions of the captured media with one of the plurality of determined positions with a timestamp associated with that determined position.

4. The non-transitory machine-readable medium of claim 1, wherein the method further comprises:
linking each of the plurality of determined positions to one of a plurality of distinct portions of the captured media.

5. The non-transitory machine-readable medium of claim 1, wherein the method further comprises:
defining at least one of the plurality of determined positions in accordance with the ISO 6709 specification.

6. The non-transitory machine-readable medium of claim 1, wherein the media file is a QuickTime™ file.

7. The non-transitory machine-readable medium of claim 1, wherein one of the plurality of determined positions includes orientation information of the electronic device.

8. The non-transitory machine-readable medium of claim 1, wherein the captured media includes role metadata, wherein the role metadata indicates if the plurality of determined current positions is one of a shooting location, real location, and a fictional location.

9. The non-transitory machine-readable medium of claim 1, wherein the media includes at least one of a video and audio.

10. The non-transitory machine-readable medium of claim 1, wherein the variable time decreases if the measured movement of the electronic device increases.

11. The non-transitory machine-readable medium of claim 1, wherein each of the plurality of intervals is a time interval further determined based on a power utilization of the electronic device.

12. The non-transitory machine-readable medium of claim 1, wherein the method further comprises:
determining, with the positioning circuitry of the electronic device, a current position associated with the captured media when the variable time corresponding to the interval reaches a maximum time.

13. The non-transitory machine-readable medium of claim 1, wherein the variable time is when the electronic device moves a predetermined distance.

14. A method of generating a media file having timed location metadata, the method comprising:
capturing, with an electronic device having a lens, a recording of media over a period of time, wherein the electronic device is moving among a plurality of different positions during the capturing;
measuring, by a motion sensor of the electronic device, movement of the electronic device;
for each of a plurality of intervals during the recording:
determining, with the electronic device, a distance that the electronic device moves during the interval based on data measured by the motion sensor;
at a variable time determined based on the distance moved by the electronic device, determining, with positioning circuitry of the electronic device, a current position associated with the captured media, the position corresponding to one of the plurality of different positions; and
storing, with the electronic device, the captured media and a plurality of determined current positions corresponding to the plurality of intervals in the media file comprising at least two tracks, wherein the media is stored in a first track and the plurality of determined current positions are stored in a second track, wherein each portion of the media being captured during each of the plurality of intervals corresponds to one of the plurality of determined current positions.

15. The method of claim 14, further comprising:
determining each of the plurality of determined current positions using one or more of a global positioning system, wireless-assisted global positioning system, a measurement of a network signal of the electronic device, and a tracking information from a known point.

16. The method of claim 14, further comprising:
correlating one of a plurality of distinct portions of the captured media with one of the plurality of determined current positions with a timestamp associated with that determined current position.

17. The method of claim 14, further comprising:
linking each of the plurality of determined current positions to one of a plurality of distinct portions of the captured media.

18. The method of claim 14, further comprising:
defining at least one of the plurality of determined current positions in accordance with the ISO 6709 specification.

19. The method of claim 14, further comprising:
determining, with the positioning circuitry electronic device, a current position associated with the captured media when the variable time corresponding to the interval reaches a maximum time.

20. The method of claim 14, wherein the variable time is when the electronic device moves a predetermined distance.

21. An electronic device comprising:
a lens configured to capture a recording of media over a period of time while the electronic device is moving among a plurality of different positions during the capturing;
a motion sensor configured to measure movement of the electronic device and determine a distance the electronic device moves during each of a plurality of variable time intervals;
positioning circuitry configured to determine, for each of the plurality of variable time intervals during the capturing:
a current position associated with the captured media and corresponding to one of the plurality of different positions, wherein the current position is determined at a time based on the distance the electronic device moves during the variable time interval; and
a metadata component configured to store the captured media and a plurality of determined current positions corresponding to the plurality of variable time intervals in a file comprising at least two tracks, wherein the media is stored in a first track and the plurality of determined current positions are stored in a second track wherein each portion of the media being captured during each of the plurality of variable time intervals corresponds to one of the plurality of determined current positions.

22. The electronic device of claim 21, wherein the positioning circuitry is further configured to determine the current position when the variable time interval reaches a maximum time.

23. The electronic device of claim 21, wherein the motion sensor includes at least one of an accelerometer and a gyroscope.

24. The electronic device of claim 21, wherein the variable time is when the electronic device moves a predetermined distance.

\* \* \* \* \*

UNITED STATES PATENT AND TRADEMARK OFFICE
CERTIFICATE OF CORRECTION

PATENT NO. : 9,501,495 B2  
APPLICATION NO. : 12/765725  
DATED : November 22, 2016  
INVENTOR(S) : David William Singer et al.

Page 1 of 1

It is certified that error appears in the above-identified patent and that said Letters Patent is hereby corrected as shown below:

On the Title Page

Item (75) Inventors: please delete "Thal-Wey Then" and insert --Thai-Wey Then--.

Below item (65) ending with "Prior Publication Data US 2011/0264715 A1 Oct. 27, 2011"
insert the following:
--(60) Related U.S. Application Data
Provisional application no. 61/171,613, filed on April 22, 2009--.

In the Specification

Column 1, Line 6: Delete "61/171,163" and insert --61/171,613--.

Signed and Sealed this  
Eighth Day of May, 2018

Andrei Iancu  
*Director of the United States Patent and Trademark Office*